(12) United States Patent
Huang et al.

(10) Patent No.: US 9,715,119 B2
(45) Date of Patent: Jul. 25, 2017

(54) ELECTROCHROMIC GRATING, METHOD FOR PRODUCING THE SAME AND 3D DISPLAY DEVICE

(71) Applicants: BOE Technology Group Co., Ltd., Beijing (CN); Beijing BOE Display Technology Co., Ltd., Beijing (CN)

(72) Inventors: Changgang Huang, Beijing (CN); Zhenyu Zhang, Beijing (CN); Yanping Liao, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 13 days.

(21) Appl. No.: 14/771,552

(22) PCT Filed: Sep. 28, 2014

(86) PCT No.: PCT/CN2014/087680
§ 371 (c)(1),
(2) Date: Aug. 31, 2015

(87) PCT Pub. No.: WO2016/004683
PCT Pub. Date: Jan. 14, 2016

(65) Prior Publication Data
US 2016/0363779 A1    Dec. 15, 2016

(30) Foreign Application Priority Data

Jul. 9, 2014    (CN) .......................... 2014 1 0325317

(51) Int. Cl.
*G03F 7/00*    (2006.01)
*G02B 27/22*    (2006.01)
(Continued)

(52) U.S. Cl.
CPC ......... *G02B 27/2214* (2013.01); *G02F 1/155* (2013.01); *G02F 1/1523* (2013.01)

(58) Field of Classification Search
CPC ..... F16D 2500/1026; F16D 2500/1083; F16D 2500/7041; F16D 2500/31413;
(Continued)

(56) References Cited

U.S. PATENT DOCUMENTS 8,113,901 B1    2/2012  Yeh et al.
9,170,484 B2 *  10/2015 Kang ..................... G03F 1/68
(Continued)

FOREIGN PATENT DOCUMENTS

CN    102096231 A    6/2011
CN    102338960 A    2/2012
(Continued)

OTHER PUBLICATIONS

Second Office Action for Chinese Patent Application No. 201410325317.2, dated Oct. 19, 2016.
(Continued)

*Primary Examiner* — Lan Vinh
(74) *Attorney, Agent, or Firm* — Westman, Champlin & Koehler, P.A.

(57) ABSTRACT

The present disclosure provides an electrochromic grating comprising: a substrate; a plurality of strip-shaped first transparent electrodes distributed on the substrate in parallel at an equal predetermined pitch; and a plurality of ion storage layers, a plurality of electrochromic layers, and a plurality of strip-shaped second transparent electrodes. One ion storage layer, one electrochromic layer and one second transparent electrode are sequentially formed on each of the first transparent electrodes, and the electrochromic layer is configured to switch from a transparent state to a shading state when different drive voltages are applied to the first and
(Continued)

second transparent electrodes. A method for producing an electrochromic grating is also provided. There is no interference between the shading region and the light-transmissive region and there is no negative impact on the effect of 2D display, providing users with a great experience.

18 Claims, 5 Drawing Sheets

(51) Int. Cl.
*G02F 1/155* (2006.01)
*G02F 1/15* (2006.01)

(58) Field of Classification Search
CPC .. G02B 27/2214; G02B 27/22; G02B 27/026; G02F 1/155; G02F 1/1525
USPC .... 430/5, 313, 322, 323; 438/717, 719, 723, 438/736
See application file for complete search history.

(56) References Cited

U.S. PATENT DOCUMENTS

2010/0271685 A1* 10/2010 Liu .................. G02B 27/2214
359/265
2012/0081776 A1* 4/2012 Yeh .................. G02B 27/2214
359/273
2012/0224246 A1 9/2012 Yeh et al.
2013/0341607 A1* 12/2013 Heo .................. H01L 51/56
257/40

FOREIGN PATENT DOCUMENTS

| CN | 102385208 A | 3/2012 |
|---|---|---|
| CN | 102681175 A | 9/2012 |
| CN | 202472131 U | 10/2012 |
| CN | 203054349 U | 7/2013 |
| CN | 103246072 A | 8/2013 |
| CN | 103376556 A | 10/2013 |
| JP | 2013-167843 A | 8/2013 |

OTHER PUBLICATIONS

International Search Report and Written Opinion for PCT Application No. PCT/CN2014/087680, dated Mar. 24, 2015, 9 pages.
English translation of Box No. V from the Written Opinion for the International Searching Authority for PCT Application No. PCT/CN2014/087680, 2 pages.
First Office Action, including Search Report, for Chinese Patent Application No. 201410325317.2, dated Jun. 21, 2016, 14 pages.
Rejection Decision for Chinese Patent Application No. 201410325317.2, dated Mar. 20, 2017, 14 pages.

* cited by examiner

ELECTROCHROMIC GRATING, METHOD FOR PRODUCING THE SAME AND 3D DISPLAY DEVICE

CROSS-REFERENCE TO RELATED APPLICATIONS

This application is a Section 371 National Stage Application of International Application No. PCT/CN2014/087680, filed 28 Sep. 2014, which claims the benefit of Chinese Patent Application No. 201410325317.2 filed on Jul. 9, 2014 in the State Intellectual Property Office of China, the whole disclosure of which is incorporated herein by reference.

FIELD OF THE DISCLOSURE

Embodiments of the present invention relate to a field of display technology, and in particular to an electrochromic grating, a method for producing the same and a 3D display device.

DESCRIPTION OF THE RELATED ART

A 3D display function has been widely used in the display device and solutions for implementing 3D display include solutions based on shutter, polarizing, grating, etc., wherein glasses are required to be worn in the solution based on shutter and the solution based on polarizing, and images can be directly viewed by naked eyes in the solution based on grating.

A 2D/3D switchable grating can be prepared by utilizing electrochromic solution in the prior art, i.e. the electrochromic solution is provided between two transparent conductive films, and a grating with alternate black and white strips is formed by controlling the electrochromic solution.

As shown in FIG. 1, the 3D grating in the prior art functions to shade the light by separating the electrochromic solution 14 into the corresponding grids by means of a barrier layer 13 provided between the first substrate 11 and the second substrate 12 and by rendering the electrochromic solution 14 to change color after a voltage is applied. In general, an ITO transparent electrode layer and a barrier layer 13 are sequentially prepared onto the first substrate 11, and the electrochromic solution 14 is instilled into the grids formed by the barrier layer 13; another ITO transparent electrode layer is prepared on the second substrate 12; and a grating is formed by folding the two substrates together. The electrochromic solution 14 instilled into the grids of barrier layer 13 is separated only by the fitting of the second substrate 12 to the first substrate 11. Since there will be a gap between the barrier layer 13 and the second substrate 12 fitted together, such a grating can not separate the electrochromic solution 14 into the corresponding grids completely. In this way, other grids that need to be transparent are penetrated by the electrochromic solution 14 and change the color after a voltage is applied, whereby affecting the 3D display effect of the 3D display panel. Further, both of the electrochromic solution and the thicker barrier layer that are used in the prior art will cause the severe refraction and scattering of the light emitted by the display panel, to degrade the 2D display effect.

SUMMARY OF THE INVENTION

To solve the above problems in the prior art, an electrochromic grating, a method for manufacturing the same and a 3D display device are provided in the present disclosure, in which an inorganic electrochromic material is used to form an electrochromic pattern. This pattern is completely transparent under a certain voltage so as not to affect the 2D display effect. The inorganic electrochromic material will change the color under another voltage so that a patterned region creates a shading effect and acts as a grating. A display panel provided with the grating can achieve a naked eye 3D display.

According to an aspect of the present disclosure, an electrochromic grating is provided, comprising:
a substrate;
a plurality of strip-shaped first transparent electrodes distributed on the substrate in parallel at an equal predetermined pitch; and
a plurality of ion storage layer, a plurality of electrochromic layer; and a plurality of strip-shaped second transparent electrodes,
wherein one ion storage layer, one electrochromic layer and one second transparent electrode are sequentially formed on each of the first transparent electrodes, and the electrochromic layer is configured to switch from a transparent state to a shading state when different drive voltages are applied to the first and second transparent electrodes.

In one embodiment, the electrochromic layer is made of inorganic electrochromic material.

In one embodiment, the electrochromic layer is made of iridium oxide $IrO_3$, tungsten oxide $WO_3$ or molybdenum oxide $MoO_3$.

In one embodiment, the ion storage layer is made of vanadium pentoxide or titanium dioxide.

In one embodiment, the electrochromic grating further comprises a drive circuit connected to the first transparent electrode and the second transparent electrode to provide a drive voltage for the electrochromic layer.

According to one embodiment of another aspect of the present disclosure, a 3D display device is provided, comprising:
a display panel; and
an electrochromic grating as described in one of the above embodiments disposed on the display panel.

In one embodiment, the display panel is an OLED display panel, and the electrochromic grating is located on a light exit side of the OLED display panel.

In one embodiment, the display panel is a liquid crystal display panel, and the electrochromic grating is located between a backlight source for providing light to the liquid crystal display panel and the liquid crystal display panel, or the electrochromic grating is located on the light exit side of the liquid crystal display panel.

According to one embodiment of a further aspect of the present disclosure, a method for producing an electrochromic grating is provided, comprising the steps of:
sequentially forming a first transparent electrode material layer, an ion storage material layer, an electrochromic material layer and a second transparent electrode material layer on a substrate; and
separating the first transparent electrode material layer, the ion storage material layer, the electrochromic material layer and the second transparent electrode material layer into a plurality of first transparent electrodes, a plurality of ion storage layers, a plurality of electrochromic layers, and a plurality of second transparent electrodes, respectively, which are distributed in parallel in a direction parallel to the substrate at an equal predetermined pitch and sequentially arranged in a direction perpendicular to the substrate, by means of patterning process.

In one embodiment, the step of forming the plurality of first transparent electrodes, the plurality of ion storage layers, the plurality of electrochromic layer, and the plurality of second transparent electrodes comprises the steps of:

coating the second transparent electrode material layer with photoresist;

exposing the photoresist to light by utilizing a mask with a plurality of patterns arranged in parallel at an equal predetermined pitch;

developing the exposed photoresist;

etching the first transparent electrode material layer, the ion storage material layer, the electrochromic material layer and the second transparent electrode material layer so that the sites of the substrate corresponding to the positions where the etching is applied are exposed; and removing the residual photoresist.

The electrochromic grating and the method for producing the same and the 3D display device according to the above embodiments of the present invention can facilitate to achieve the naked eye 3D display and to switch between the naked eye 3D display and the 2D display. Further, the position of the shading pattern of the electrochromic grating prepared according to any one of the above embodiments of the present invention is stationary and can strictly distinguish a light-transmissive region from a shading region so that there is no interference between the light-transmissive region and the shading region and there is no negative impact on the effect of 2D display, providing users with a great experience.

DETAILED DESCRIPTION OF EMBODIMENTS

In order that the purpose, the technical solutions, and advantages of the present disclosure become more apparent and explicit, the present disclosure will be further described in detail in connection with the particular embodiments with reference to the accompanying drawings.

In the following detailed description, for the purpose of explanation, many specific details are set forth to provide a complete understanding of the embodiments disclosed herein. However, it is obvious that one or more embodiments can also be implemented without these specific details. In other instances, well-known structures and devices will be shown in illustration so as to simplify the drawings.

Figure 1:
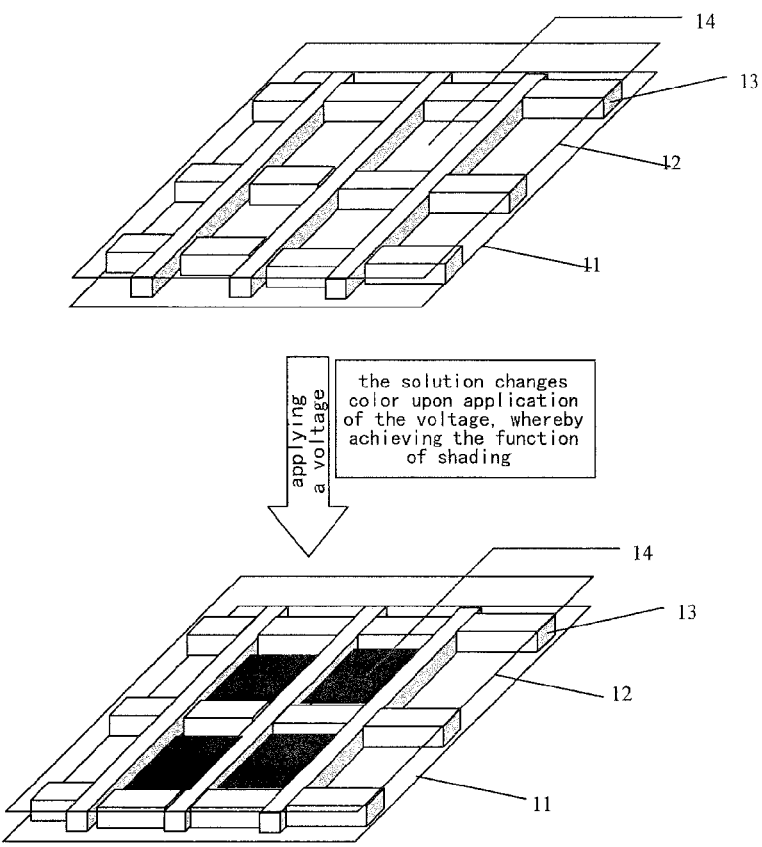
FIG. 1 is a schematic view of principle of a grating of a 3D display panel in the prior art.
Figure 2:
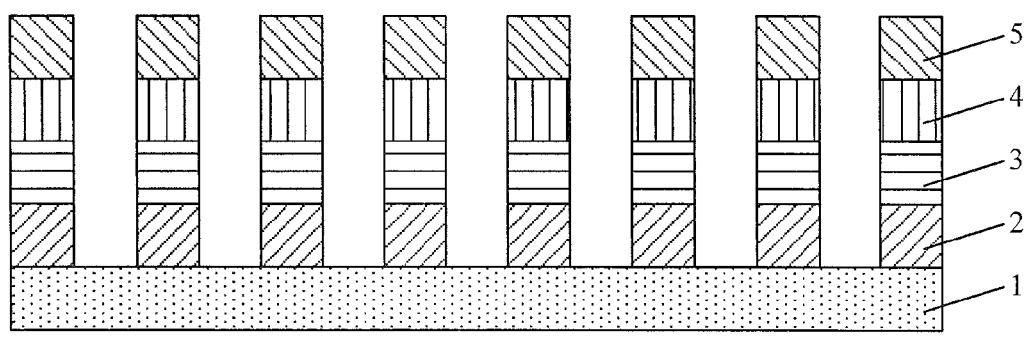
FIG. 2 is a schematic view of a partial cross-sectional structure of an electrochromic grating according to an embodiment of the present invention.

According to an embodiment of one aspect of the present invention, an electrochromic grating, shown in FIG. 2, is provided, which comprises: a substrate 1, a plurality of strip-shaped first transparent electrodes 2, a plurality of ion storage layers 3, a plurality of electrochromic layers 4 and a plurality of strip-shaped second transparent electrodes 5. The plurality of strip-shaped first transparent electrodes 1 are distributed on the substrate 1 in parallel at an equal predetermined pitch. One ion storage layer 3, one electrochromic layer 4, and one second transparent electrode 5 are sequentially formed on each of the first transparent electrodes 2. The electrochromic layer is configured to switch from a transparent state in which a light beam can pass through to a shading state in which transmission of the light beam can be prevented when different drive voltages are applied to the first transparent electrode 2 and the second transparent electrode 5. Then, each of the first transparent electrodes 2, and the ion storage layers 3, the electrochromic layers 4 and the second transparent electrodes 5 sequentially formed on the first transparent electrode 2 form barrier layers distributed in parallel at an equal predetermined pitch. In the electrochromic grating of the embodiment of the present invention, since the barrier layers are formed in parallel on the substrate 1 at an equal predetermined pitch, the arrangement pitch of the barrier layers will be the arrangement pitch of the electrochromic layers 4. The predetermined pitch between two adjacent barrier layers may be determined by the number of viewpoints, the pixel size of display panel and the interpupillary distance and can be expressed by the following formula:

$$f = \frac{n * p}{1 + p/e},$$

where f is the arrangement pitch of the electrochromic grating, n is the number of viewpoints, p is the width of sub-pixel of the display panel matching to the electrochromic grating, and e is the interpupillary distance.

Alternatively, the patterns of respective film layers are formed by means of patterning process, such as photolithography.

Alternatively, the substrate 1 may be made of any one of glass, silicon sheet, quartz, plastic, and the like, and, for example, made of glass.

In an exemplary embodiment, both the first transparent electrode 2 and the second transparent electrode 5 are made of transparent conductive material. The transparent conductive material comprises a transparent metal thin film, a transparent metal oxide thin film, a non-metallic oxide thin film and a conductive particle-dispersed ferroelectric material. The thin film may be a film of single layer, two layers, clad layer films or multi-layer films, and may be no doping type, doping type and multi-element type. For example, the transparent conductive material comprises a metal oxide thin film, such as indium tin oxide (ITO) film.

Alternatively, the thickness of the first transparent electrode 2 and the second transparent electrode 5 is 0.02~0.50 μm. For example, the first transparent electrode material layer for forming the first transparent electrode and the second transparent electrode material layer for forming the second transparent electrode are respectively formed by using semiconductor process, such as depositing or sputtering process.

The ion storage layer 3 is used to store and provide ions necessary for electrochromic application to maintain a charge balance. The ion storage layer 3 is made of vanadium pentoxide $V_2O_5$ or titanium dioxide $TiO_2$, and the like. For example, ion storage layer 3 is made of vanadium pentoxide $V_2O_5$ which has good ion storage performance and has a characteristic of semiconductor and a layered structure, which facilitates the storage and transport of ions so as to maintain the charge balance in the electrochromic layer. The ion storage layer 3 has a thickness of 0.2~1 μm. The ion storage layer 3 can be forming by means of semiconductor process, such as sputtering.

In an exemplary embodiment, the electrochromic layer 4 is made of inorganic electrochromic material, such as iridium oxide $IrO_3$, tungsten oxide $WO_3$ or molybdenum oxide $MoO_3$. The thickness of the electrochromic layer 4 is 1.5~10 nm. For example, the electrochromic material layer is formed by means of semiconductor process, such as depositing or sputtering.

According to the electrochromic grating in the embodiment of the present invention, since the electrochromic layer 4 is formed of a solid film, the electrochromic layers located in two adjacent barrier layers respectively are physically isolated from each other so that the electrochromic layer in one barrier layer will not affect the light-transmissive property in other light-transmissive regions, thereby improving the 3D display effect of 3D display device comprising such an electrochromic grating.

The electrochromic grating according to an embodiment of the present invention further comprises a drive circuit (not shown) which is connected to the first transparent electrode 2 and the second transparent electrode 5 to provide the drive voltage for the electrochromic layer 4. Alternatively, the electrochromic grating can be driven by direct current. For example, the drive voltage for the electrochromic grating is 2~20V. It should be noted that there are some differences in the drive voltage for different electrochromic materials, and thus the specific scope of the drive voltage should be determined according to the characteristics of the different electrochromic materials in specific applications.

In one embodiment of the present invention, the electrochromic layer 4 in the electrochromic grating is initially transparent. After an electric field for driving is applied to the electrochromic grating, the electrochromic material in the electrochromic layer 4 will change the color, for example into black which has an effect of shading the light, forming a shading pattern which functions as a grating, wherein the optical density (OD) of the electrochromic material that changes color is 2 to 3, and the transmissivity for a visible light is 0.1 to 1%. In this embodiment, the electrochromic material presents a transparent state in which transmission of the light beam is allowed when no voltages are applied or the voltage applied is lower than a predetermined value and presents a shading state in which the transmission of the light is prevented when the voltage applied is greater than the predetermined value. Of course, the electrochromic material, which presents a shading state when no voltages are applied or the voltage applied is lower than a predetermined value and presents a transparent state when the voltage applied is greater than the predetermined value, can also be used for the electrochromic grating in the embodiment of the present application. For example, in one embodiment, the electrochromic layer is made of an electrochromic material that presents a transparent state upon application of a first voltage value and presents a shading state upon application of a second voltage value.

Further, in one embodiment, in the drive voltage range of 2~20V, the optical density in the electrochromic layer at the location corresponding to the shading pattern increases, the transmissivity of the visible light reduces and the electrochromic layer is gradually switched from a transparent state to a shading state as the drive voltage increases.

It should be noted that it is also possible to employ other drive modes to drive the electrochromic grating. There is no particular limit on the drive modes for the electrochromic grating in the present disclosure as long as the electrochromic grating can be driven such that the electrochromic material at the location corresponding to the shading pattern can change the color.

Figure 3:
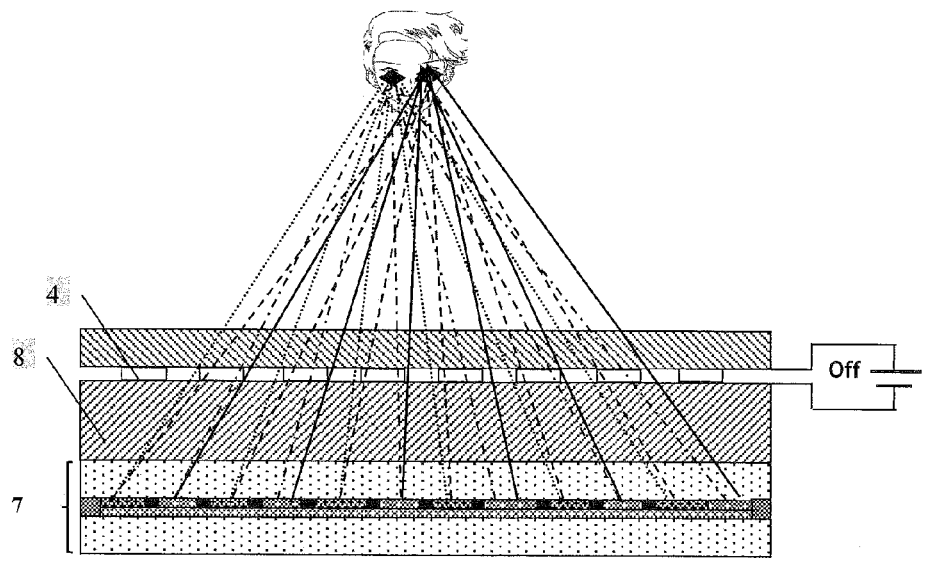
FIG. 3 is a schematic view of 2D display principle in 3D display panel provided with an electrochromic grating of the present disclosure.
Figure 4:
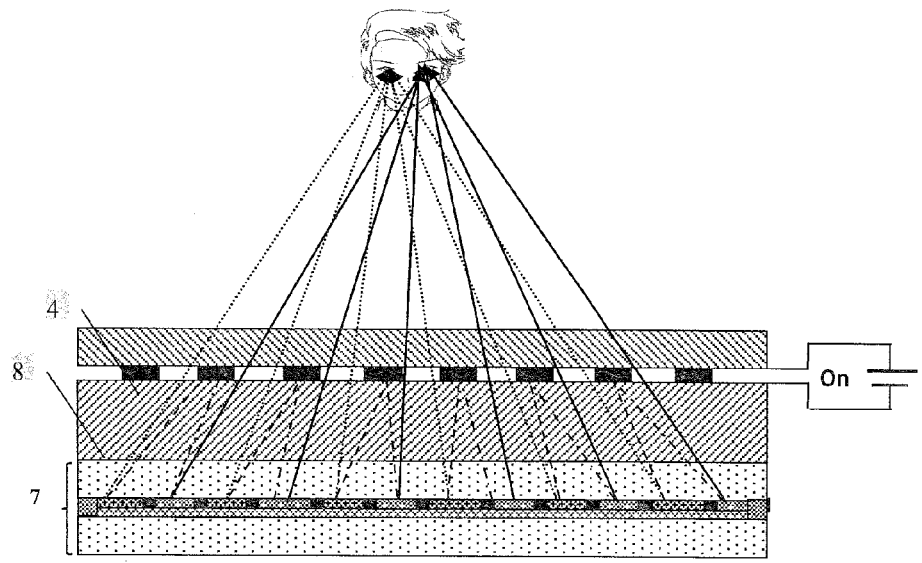
FIG. 4 is a schematic view of 3D display principle in 3D display panel provided with an electrochromic grating of the present disclosure.

The electrochromic grating according to the embodiment of the present invention presents a transparent state when no voltages are applied to the electrochromic layer or the voltage applied is lower than a predetermined value and presents a shading state when the voltage applied is greater than the predetermined value. As shown in FIG. 4, when a certain external voltage is applied to the electrochromic grating, the material in the electrochromic layer at the location corresponding to the shading patterns may change its color into a constant color and becomes in a shading state, for example, into black. At this time, part of the light emitted by the display panel 7 is blocked by the portions of the display panel that have changed its color into black, and part of the light passes through the gaps between the shading patterns where no electrochromic layers are provided, whereby achieving the function of a grating. In this case, the left and right eye images displayed by the display panel are respectively projected onto the left and right eye viewing zone in front of the display panel 7, and 3D images can be seen when the viewer's left and right eyes are located in the left and right eye viewing zone, respectively, whereby achieving the naked eye 3D display. As shown in FIG. 3, when the external voltage applied is removed or the applied voltage is less than a predetermined value, the material in the electrochromic layer at the location corresponding to the shading pattern returns to the transparent state and all of the light emitted by the display panel 7 passes therefrom without being blocked, whereby achieving the 2D display. Accordingly, the display device having the electrochromic grating according to any one of the above embodiments of the present invention can facilitate achieving the naked eye 3D display and switching between the naked eye 3D display and the 2D display. Further, the position of the shading pattern of the electrochromic grating according to any one of the above embodiments of the present invention is stationary and can strictly distinguish a shading region from a light-transmissive region so that there is no interference between the shading region and the light-transmissive region and there is no negative impact on the effect of 2D display, so as to provide users with a great experience.

In one embodiment of the present invention, the display panel 7 is an ordinary 2D display, and, for example, may be an organic light emitting diode (OLED) display panel, a thin film transistor liquid crystal (TFT-LCD) display panel, or an active matrix organic light emitting diode (AMOLED) display panel.

According to another embodiment of the present invention, a 3D display device, as shown in FIG. 4, is provided, which includes a display panel 7 and an electrochromic grating according to any one of the above embodiments disposed on the display panel.

In one embodiment, the 3D display device further comprises a spacer glass 8 which is located between the electrochromic grating and the display panel 7.

In one embodiment, the display panel 7 is an OLED display panel, and the electrochromic grating is located on the light exit side of the OLED display panel. In another embodiment, the display panel 7 is a liquid crystal display panel, and the electrochromic grating is located between the backlight source (not shown) for supplying light to the liquid crystal display panel and the liquid crystal display panel, or the electrochromic grating is located on the light exit side of the liquid crystal display panel.

The display device according to the present disclosure may be a liquid crystal TV, a liquid crystal panel, an OLED TV, an OLED panel, a mobile phone, a laptop or a navigator, and the like.

According to the embodiment of another aspect of the present invention, a method for producing an electrochromic grating is also provided, comprising the steps of:

sequentially forming a first transparent electrode material layer, an ion storage material layer, an electrochromic material layer and a second transparent electrode material layer on a substrate 1; and separating the first transparent electrode material layer, the ion storage material layer, the electrochromic material layer and the second transparent electrode material layer into a plurality of first transparent electrodes 2, a plurality of ion storage layers 3, a plurality of electrochromic layers 4, and a plurality of second transparent electrodes 5, which are distributed in parallel in a direction parallel to the substrate at an equal predetermined pitch and sequentially arranged in a direction perpendicular to the substrate 1, by means of patterning process. In one embodiment of the present invention, after forming the first transparent electrode material layer, the ion storage material layer, the electrochromic material layer and the second transparent electrode material layer, the first transparent electrode 2, the ion storage layer 3, the electrochromic layer 4 and the second transparent electrode 5 are formed by means of one step patterning process.

Of course, during forming the first transparent electrode, the ion storage layer, the electrochromic layer and the second transparent electrode, the mode, in which a patterning process can be applied each time after one material layer is formed, is employed, and other modes are also possible. It should be noted that there is no specific limitation on the particular mode for forming the respective film layers in the present disclosure, and any other reasonable modes for forming the respective film layers will fall within the protection scope of the present invention.

In one embodiment, the step of forming the plurality of first transparent electrodes 2, the plurality of ion storage layers 3, the plurality of electrochromic layers 4 and the plurality of second transparent electrode 5 comprises the steps of:

coating the second transparent electrode material layer with photoresist 6;

exposing the photoresist 6 to light by utilizing a mask (not shown) with a plurality of patterns arranged in parallel at an equal predetermined pitch;

developing the exposed photoresist;

etching the first transparent electrode material layer, the ion storage material layer, the electrochromic material layer and the second transparent electrode material layer so that the sites of the substrate 1 corresponding to the positions where the etching is applied are exposed and so that the first transparent electrode material layer and the second transparent electrode material layer respectively form a plurality of first transparent electrodes 2 and a plurality of second transparent electrodes 4 arranged in parallel at an equal pitch; and removing the photoresist located on the uppermost layer. Then, each of the first transparent electrodes 2, and the ion storage layers 3, the electrochromic layers 4 and the second transparent electrodes 5 sequentially formed on the first transparent electrode 2 from barrier layers distributed in parallel at an equal predetermined pitch.

Figure 5A:
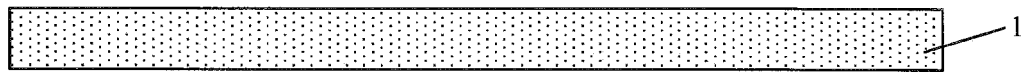
FIGS. 5A-5J are schematic views showing a process for producing an electrochromic grating according to an embodiment of the present invention.
Figure 5B:
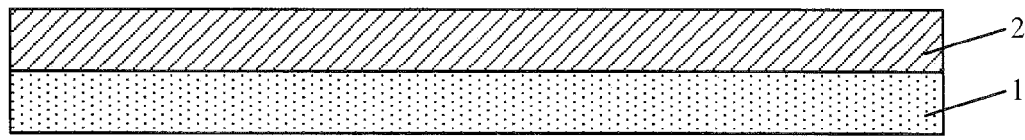
Figure 5C:
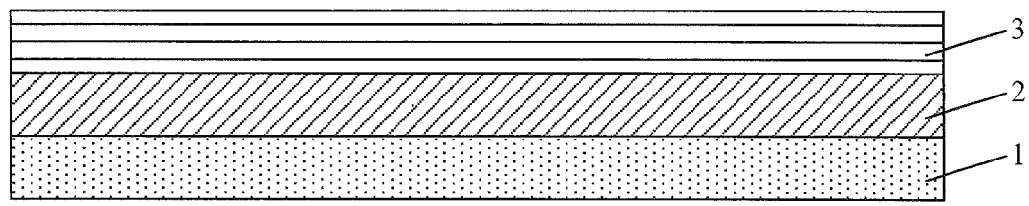
Figure 5D:
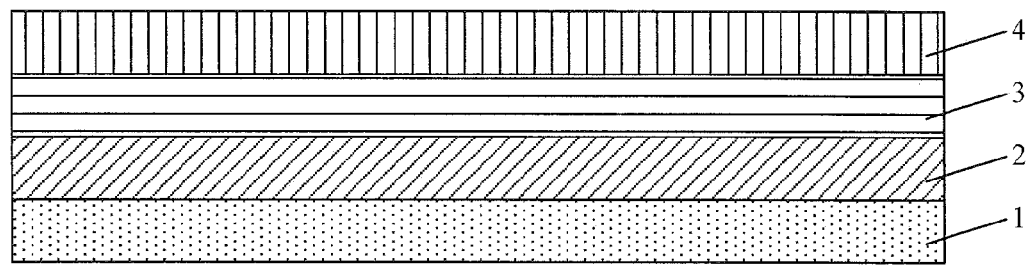
Figure 5E:
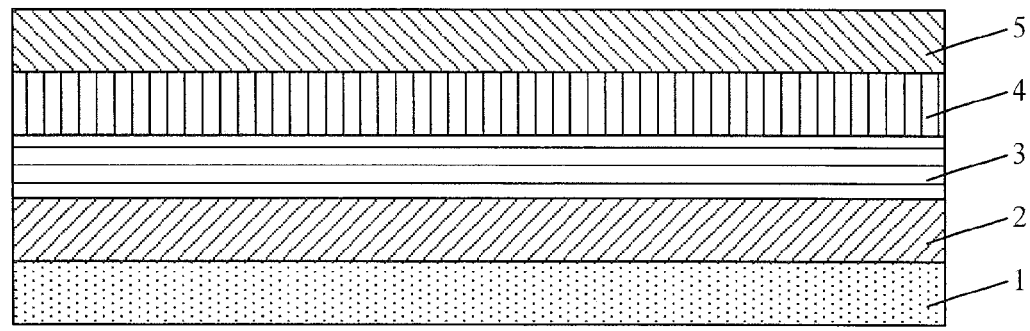
Figure 5F:
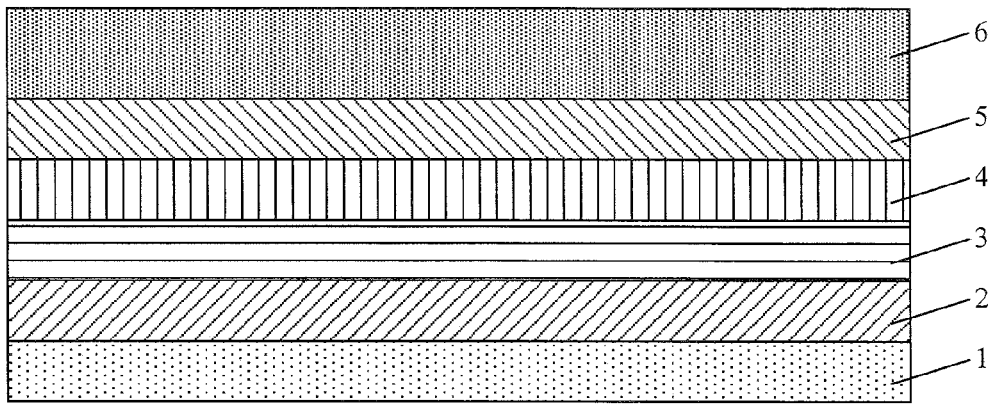
Figure 5G:
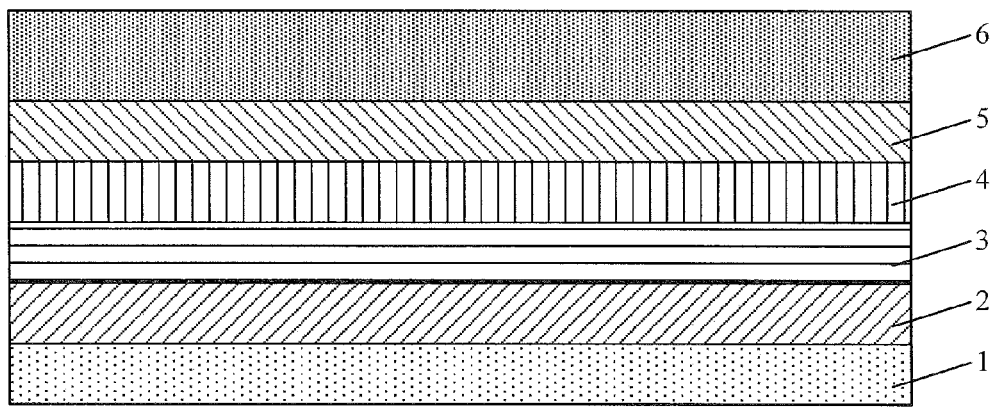
Figure 5H:
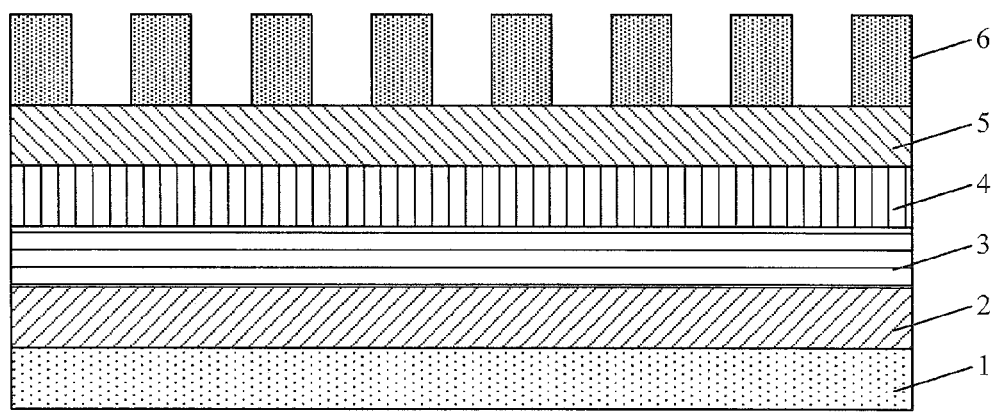
Figure 5I:
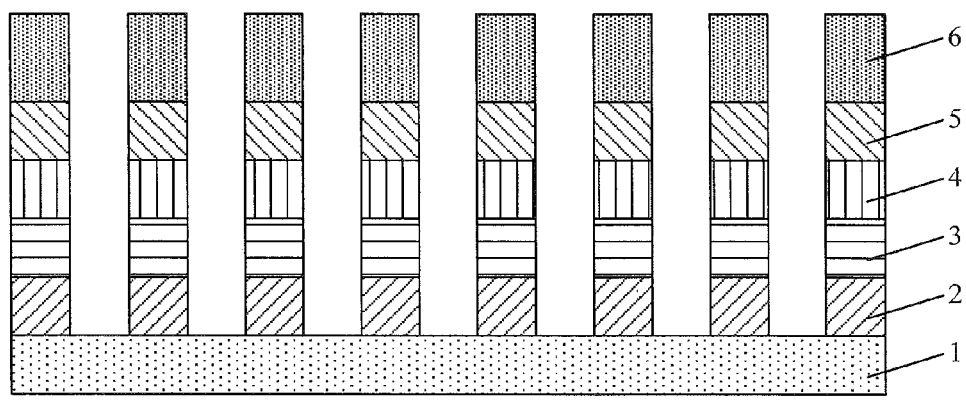
Figure 5J:
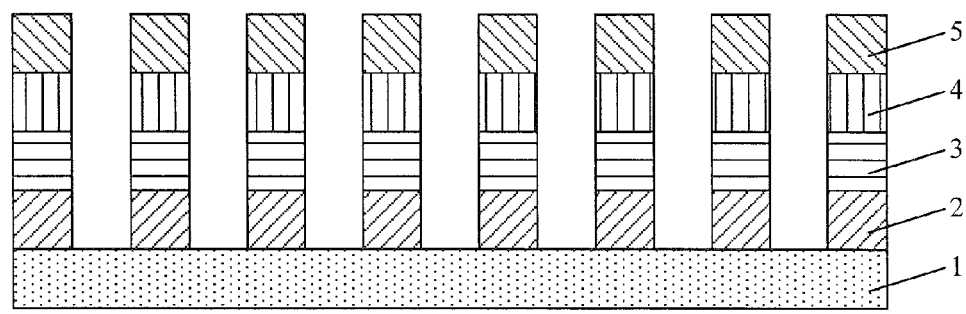

FIGS. 5A-5J are schematic views of process for producing an electrochromic grating according to an embodiment of the present invention. As shown in FIGS. 5A-5J, the method for producing an electrochromic grating in this embodiment comprises the steps of:

forming a first transparent conductive layer on a substrate 1, as shown in FIGS. 5A and 5B;

forming an ion storage material layer 3 on the first transparent conductive layer 2, as shown in FIG. 5C;

forming an electrochromic material layer 4 on the ion storage material layer 3, as shown in FIG. 5D;

forming a second transparent conductive layer on the electrochromic material layer 4, as shown in FIG. 5E;

coating the second transparent conductive layer with photoresist 6, as shown in FIG. 5F;

exposing the photoresist to light by utilizing a mask (not shown) with a plurality of patterns arranged in parallel at an equal predetermined pitch, as shown in FIG. 5G;

developing the exposed photoresist, as shown in FIG. 5H;

etching the first transparent conductive layer, the electrochromic layer and the second transparent conductive layer so that the sites of the substrate 1 corresponding to the positions where the etching is applied are exposed and so that the first transparent electrode material layer and the second transparent electrode material layer form a plurality of first transparent electrodes 2 and a plurality of second transparent electrodes 4 arranged in parallel at an equal pitch, respectively. In this way, each barrier layer formed on the substrate 1 sequentially comprises a first transparent electrode 1, an ion storage layer 3, an electrochromic layer 4 and a second transparent electrode 5, as shown in FIG. 5I;

removing the photoresist located on the uppermost layer, whereby forming the electrochromic grating according to the embodiment of the present invention, as shown in FIG. 5J.

The processes in the above producing method, such as photoresist coating, exposing, developing, etching and removing, are similar to the existing producing processes of the display device, and the explanations to these processes will be omitted herein.

As such, an electrochromic grating having shading patterns regularly arranged and defined by the barrier layers is formed after the processes of film forming, exposing, developing, etching and removing. As shown in FIG. 4, when an electric field for driving is applied to the electrochromic grating, the material in the electrochromic layer at the location corresponding to the shading patterns may change from colorlessness and transparentness into black such that part of the light emitted by the display panel is blocked by the portions of the display panel that have become black, and there is no electrochromic material being provided at the gaps between the shading patterns. Part of the light beam emitted by the display panel passes through the gaps between the shading patterns, projecting the left and right eye images displayed by the display panel onto the left and right eye viewing zones in front of the display panel, and 3D images can be seen when the viewer's left and right eyes are located in the left and right eye viewing zones, respectively, whereby achieving the naked eye 3D display.

Alternatively, the electrochromic grating may be driven by direct current, for example, of 2~20V. The optical density in the electrochromic layer at the location corresponding to the shading pattern increases, the transmissivity of the visible light is reduced and the electrochromic layer is gradually switched from a transparent state to a shading state as the drive voltage increases.

As shown in FIG. 3, when the voltage applied outside is removed, the material in the electrochromic layer at the location corresponding to the shading pattern returns to the transparent state and all of the light emitted by the display panel 7 passes therefrom without being blocked, whereby achieving the 2D display.

Accordingly, the display device having the electrochromic grating prepared according to any one of the above embodiments of the present invention can facilitate achieving the naked eye 3D display and switching between the naked eye 3D display and the 2D display. Further, the position of the shading pattern of the electrochromic grating produced according to any one of the above embodiments of the present invention is stationary and can strictly distinguish a shading region from a light-transmissive region so that there is no interference between the shading region and the light-transmissive region and there is no negative impact on the effect of 2D display, providing users with a great experience.

Although the purpose, the technical solutions and the advantages of the present invention have been further described in detail in connection with the specific embodiments above, it should be appreciated that the description above which is only the specific embodiment of the present invention is not intended to limit the invention and any modifications, equivalents, improvements made within the spirit and principles of the present invention will fall within the protection scope of the present invention.

The invention claimed is:

1. An electrochromic grating, comprising:
a substrate;
a plurality of strip-shaped first transparent electrodes distributed on the substrate in parallel at an equal pitch; and
a plurality of ion storage layers, a plurality of electrochromic layers, and a plurality of strip-shaped second transparent electrodes,
wherein one ion storage layer, one electrochromic layer and one second transparent electrode are sequentially formed on each of the first transparent electrodes, and the electrochromic layer is configured to be switched from a transparent state to a shading state when different drive voltages are applied to the first and second transparent electrodes, and
wherein the equal pitch can be determined by the number of viewpoints, the pixel size of display panel and the interpupillary distance and can be expressed by the following formula:

$$f = n*p/1 + p/e,$$

where f is the equal pitch of the electrochromic grating, n is the number of viewpoints, p is the width of sub-pixel of the display panel matching to the electrochromic grating, and e is the interpupillary distance.

2. The electrochromic grating according to claim 1, wherein the electrochromic layer is made of an inorganic electrochromic material.

3. The electrochromic grating according to claim 2, wherein the electrochromic layer is made of iridium oxide, tungsten oxide or molybdenum oxide.

4. The electrochromic grating according to claim 1, wherein the ion storage layer is made of vanadium pentoxide or titanium dioxide.

5. The electrochromic grating according to claim 1, further comprising a drive circuit connected to the first transparent electrode and the second transparent electrode to provide the drive voltage for the electrochromic layer.

6. A 3D display device, comprising:
a display panel; and
an electrochromic grating as claimed in claim 1 disposed on the display panel.

7. The 3D display device according to claim 6, wherein the display panel is an OLED display panel, and the electrochromic grating is located on a light exit side of the OLED display panel.

8. The 3D display device according to claim 6, wherein the display panel is a liquid crystal display panel, and the electrochromic grating is located between a backlight source for providing light to the liquid crystal display panel and the liquid crystal display panel, or the electrochromic grating is located on the light exit side of the liquid crystal display panel.

9. A method for producing an electrochromic grating, comprising the steps of:
sequentially forming a first transparent electrode material layer, an ion storage material layer, an electrochromic material layer and a second transparent electrode material layer on a substrate; and
separating the first transparent electrode material layer, the ion storage material layer, the electrochromic material layer and the second transparent electrode material layer into a plurality of first transparent electrodes, a plurality of ion storage layers, a plurality of electrochromic layers, and a plurality of second transparent electrodes, respectively, which are distributed in parallel in a direction parallel to the substrate at an equal pitch and sequentially arranged in a direction perpendicular to the substrate, by means of a patterning process,
wherein the equal pitch can be determined by the number of viewpoints, the pixel size of display panel and the interpupillary distance and can be expressed by the following formula:

$$f = n*p/1 + p/e,$$

where f is the equal pitch of the electrochromic grating, n is the number of viewpoints, p is the width of sub-pixel of the display panel matching to the electrochromic grating, and e is the interpupillary distance.

10. The method according to claim 9, wherein the step of forming the plurality of first transparent electrodes, the plurality of ion storage layers, the plurality of electrochromic layers, and the plurality of second transparent electrodes comprising the steps of:
coating the second transparent electrode material layer with photoresist;
exposing the photoresist to light by utilizing a mask with a plurality of patterns arranged in parallel at an equal pitch;
developing the exposed photoresist;
etching the first transparent electrode material layer, the ion storage material layer, the electrochromic material layer and the second transparent electrode material layer so that the sites of the substrate corresponding to the positions where the etching is applied are exposed; and
removing residual photoresist.

11. The electrochromic grating according to claim 2, wherein the ion storage layer is made of vanadium pentoxide or titanium dioxide.

12. The electrochromic grating according to claim 3, wherein the ion storage layer is made of vanadium pentoxide or titanium dioxide.

13. The 3D display device according to claim 6, wherein the electrochromic layer is made of inorganic electrochromic material.

14. The 3D display device according to claim 13, wherein the electrochromic layer is made of iridium oxide, tungsten oxide or molybdenum oxide.

15. The 3D display device according to claim 6, wherein the ion storage layer is made of vanadium pentoxide or titanium dioxide.

16. The 3D display device according to claim 13, wherein the ion storage layer is made of vanadium pentoxide or titanium dioxide.

17. The 3D display device according to claim 14, wherein the ion storage layer is made of vanadium pentoxide or titanium dioxide.

18. The 3D display device according to claim 6, wherein the electrochromic grating further comprising a drive circuit connected to the first transparent electrode and the second transparent electrode to provide a drive voltage for the electrochromic layer.

* * * * *